Dec. 28, 1948.　　　R. S. DIETHERT　　　2,457,535
ELECTRICAL TERMINAL BUSHING

Filed July 20, 1944

Inventor
Russell S. Diethert
By
Attorney

Patented Dec. 28, 1948

2,457,535

UNITED STATES PATENT OFFICE 2,457,535

ELECTRICAL TERMINAL BUSHING

Russell S. Diethert, Chicago, Ill., assignor to Northwest Plastics, Inc., St. Paul, Minn., a corporation of Minnesota Application July 20, 1944, Serial No. 545,841

4 Claims. (Cl. 174—153)

This invention relates to an electrical terminal bushing adapted to be used as an electrical conductor for an electrical capacitator or condenser or as an electrical terminal alone.

This electrical terminal bushing and condenser means extending through the same may be used on containers that have a vacuum or wherein a pressure is formed in the container, or it may be used in a liquid container where electrical conductor means are desired to be hermetically sealed and passed through the wall of the container.

A feature resides in providing an electrical terminal bushing with conductor means, which bushing is adapted to be adjustable for sealing the condenser and after the condenser is sealed. This adjustable means is provided by a thread formed on the bushing which cooperates with a nut to draw the bushing taut when it is attached to the wall of the container. It is very desirable that an electrical terminal bushing of this character be adjustable to be fitted to the wall of the container before the same is sealed and even after the container is sealed, it sometimes becomes desirable to adjust the bushing terminal to cause a hermetical sealing of the container around the terminal. This can be readily accomplished by an adjustable nut which is threaded to the body of the insulating bushing.

It is also a feature to provide an electrical terminal bushing which can be molded from various types of plastic material, which may include ceramics, rubber compounds, cellulose acetate, plastics or other phenolic plastics, or any other type of molding compound which may be desirable for use in a bushing of this character.

Furthermore, this electrical terminal bushing may be used on relays, transformers, vibrators, and to provide an electric feed through the insulating bushing with a hermetically sealed electrical terminal means extending through the bushing. It will be apparent that this bushing and terminal may be used on containers of metal, glass, fibre, paper, or plastic containers, and it is of primary importance that the sealing of the bushing in relation to the container may be adjusted by the thread and other means provided so that after the gaskets used about the bushing have set or shrunk, the sealing of the bushing may be adjusted by the lock nut provided for this purpose.

In the drawings forming a part of the specification:

Figure 1:
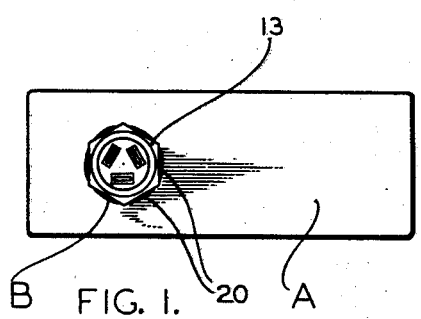
Figure 1 is a plan view of electrical transformer or condenser.
Figure 2:
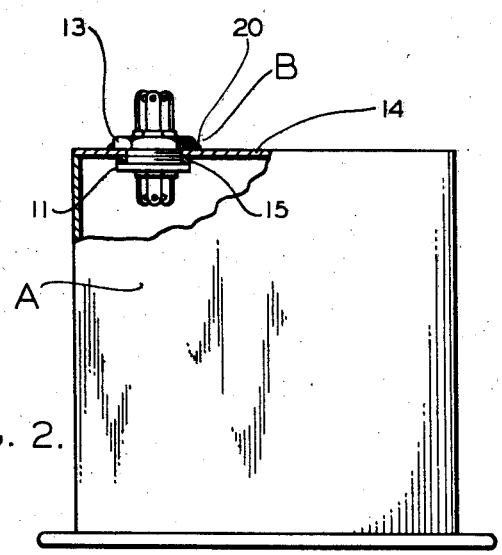
Figure 2 is a side view of the same, a portion of which is broken away to illustrate my electrical terminal bushing extending through the wall of the same.
Figure 3:
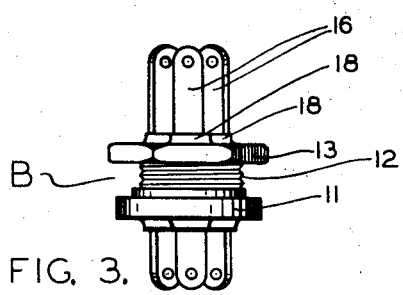
Figure 3 is a side elevation of my electrical terminal bushing.
Figure 4:
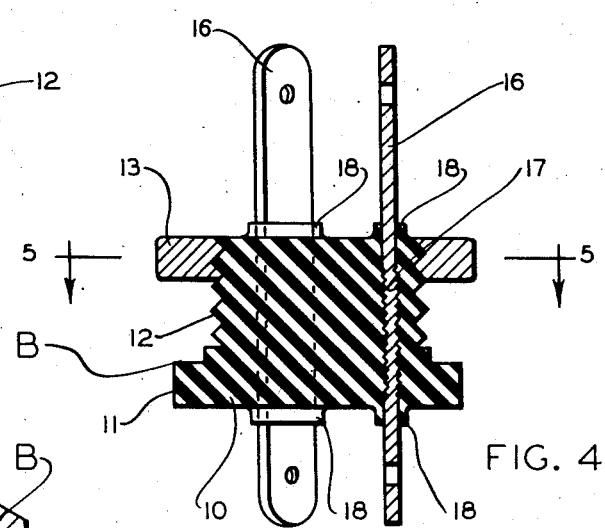
Figure 4 is a section on the line 4—4 of Figure 3.
Figure 5:
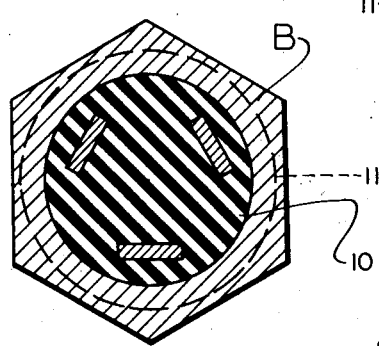
Figure 5 is a section on the line 5—5 of Figure 4.

The drawings illustrate the transformer or condenser A in which my electrical terminal bushing B is adapted to be sealed.

The electrical terminal bushing B is formed with a non-metallic plastic body 10 which may be molded into any suitable plastic material and is formed with a shoulder 11 on one end, and a threaded shank 12 formed on the other end.

A lock nut 13 is provided for locking electrical terminal bushing to the wall 14 of the transformer or condenser or other electrical unit, wherein a terminal of this character is desired. Suitable gasket means 15 may be employed adjacent the shoulder 11 and beneath the nut 13. The shank of the bushing may be locked and hermetically sealed to the wall 14 of the container A.

In forming the non-metallic plastic body 10, which is adapted to be molded in suitable dies (not illustrated) for making the same, it is desirable to simultaneously mold electrical terminal means 16. The electrical terminals 16 may be in any suitable form and are adapted to project through the bushing 10 with the ends projecting from either end of the bushing. The terminals 16 may be flat in formation, or of any other desirable shape, and the portion between the ends of the terminal are preferably serrated at 17. The serrated portions 17 of the terminal 16 are adapted to be anchored and molded on the body 10. These serrations assist in locking and sealing the terminal 16 in the body 10 of the bushing.

In forming the bushing, it is also desirable to form insulating bosses 18 extending longitudinally of the terminals 16 and projecting from either end of the bushing, thus extending the insulating means to the desired extent along the electrical terminals so as to increase the insulating properties of the bushing and to strengthen the sealing means of the bushing.

My electrical terminal bushings may be made in small minute formation or in larger formations as may be desired, and one or more electrical terminals may be formed or molded in the bushing to fulfil the requirements of an electrical conductor and bushing of this character. This electrical terminal bushing and conductor has been found to be very desirable for use by the government with electrical apparatus, and in tests, the insulating properties between the terminals have proven very satisfactory.

Furthermore, this electrical terminal bushing is desirable because it can be assembled to the wall of the container and sealed thereto by the locking nut 13, and after the container has been sealed, this terminal bushing can be adjusted to more effectively seal the same and to lock the sealing nut 13 by soldering the same at the edges of the nut at 20, if it is desired, thus locking the nut rigidly in place after it has been finally adjusted in the desired locking position.

I claim:

1. An electric terminal of the character described including, the elongate flat-strip-like conductor elements, transverse serrations formed on the flat opposed side faces of said conductor elements, a non-metallic plastic body of insulating material molded about and between said conductor elements intermediate the ends of the latter and extending into said serrations so as to prevent relative longitudinal movements between said conductor elements and body, said body being formed with flat parallel ends and a flanged end and an externally screw-threaded surface, and means threadedly engaged with the externally threaded surface of the body.

2. An electrical terminal comprising a body of non-conducting material, flat sided conductor elements molded in said body extending outward from each end of said body and spaced near the periphery thereof, serrations formed transversely on the flat sides of said conductors, filleted bosses on each end of said body thru which the conductor elements extend, one end of said body having threads, the other end having a shoulder, means for threadedly engaging the threads of said body whereby said terminal may be inserted into an opening in a container and adaptably secured by said means.

3. An electrical terminal including a cylindrical body of non-conducting material, flat sided conductor elements molded in said body extending outward from each end of said body and equally spaced apart and positioned near the periphery thereof, V-shaped serrations formed transversely on the flat sides of said conductors thruout the portion embedded in said body, filleted bosses surrounding each end of said conductors at the point of exposure of the conductors extending out of said body and shaped to said conductors one end of said body having threads, the other end having a shoulder, a nut threadedly engaging the threads of said body whereby said electrical terminal may be locked into position when extending thru the wall of a container adapted to be secured by said nut.

4. An electrical terminal including a threaded cylindrical body, a washer-like shoulder formed integrally on one end of said body, a series of three flat electrical conductors adapted to be molded into said body with their ends projecting therefrom, serrations formed transversely in the broad flat surfaces of said conductors to firmly anchor each conductor in said body, said conductors being spaced apart and positioned near the outer surface of said body to give a wide electrical gap between each of said conductors, and nut means for locking said electrical terminal to a wall of a container whereby the inner ends of said conductors are positioned within the container and the outer ends of said conductors are exposed on the outside of the container.

RUSSELL S. DIETHERT.

REFERENCES CITED

The following references are of record in the file of this patent:

UNITED STATES PATENTS

| Number | Name | Date |
|---|---|---|
| 830,501 | Goehst | Sept. 11, 1906 |
| 1,295,464 | Faccioli | Feb. 25, 1919 |
| 1,456,110 | Mackay | May 22, 1923 |
| 1,604,111 | Bingay | Oct. 26, 1926 |
| 1,759,997 | Pieper | May 27, 1930 |
| 1,918,736 | Brownell | July 18, 1933 |
| 2,015,421 | Eckstein et al. | Sept. 24, 1935 |
| 2,015,590 | Cavanagh et al. | Sept. 24, 1935 |
| 2,219,573 | Fraenckel | Oct. 29, 1940 |
| 2,246,800 | Ingram | June 24, 1941 |
| 2,305,150 | Fearon | Dec. 15, 1942 |
| 2,321,840 | McDougal | June 15, 1943 |
| 2,387,630 | Weakley | Oct. 23, 1945 |

FOREIGN PATENTS

| Number | Country | Date |
|---|---|---|
| 205,227 | Great Britain | Oct. 18, 1923 |